United States Patent
Bellorado et al.

(10) Patent No.: US 10,608,808 B1
(45) Date of Patent: *Mar. 31, 2020

(54) ITERATIVE RECOVERY FROM BASELINE OR TIMING DISTURBANCES

(71) Applicant: Seagate Technology LLC, Cupertino, CA (US)

(72) Inventors: Jason Vincent Bellorado, San Jose, CA (US); Marcus Marrow, San Jose, CA (US); Zheng Wu, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/134,293

(22) Filed: Sep. 18, 2018

Related U.S. Application Data

(63) Continuation of application No. 15/389,385, filed on Dec. 22, 2016, now Pat. No. 10,084,553.

(51) Int. Cl.
*H04B 17/21* (2015.01)
*H04L 7/033* (2006.01)
*H04L 7/00* (2006.01)
*H04L 25/03* (2006.01)
*H04L 1/00* (2006.01)

(52) U.S. Cl.
CPC .............. *H04L 7/0332* (2013.01); *H04L 1/00* (2013.01); *H04L 7/0029* (2013.01); *H04L 25/03057* (2013.01); *H04L 25/03286* (2013.01); *H04L 25/03318* (2013.01)

(58) Field of Classification Search
CPC .............. H04L 27/01; H04L 25/03044; H04L 25/03057; H04L 25/03146; H04L 7/0332; H04L 1/00; H04L 7/0029
USPC .................... 375/229–233, 341, 347–350
See application file for complete search history.

(56) References Cited

U.S. PATENT DOCUMENTS

| | | | |
|---|---|---|---|
| 5,369,345 | A | 11/1994 | Phan et al. |
| 5,563,746 | A | 10/1996 | Bliss |
| 5,726,818 | A | 3/1998 | Reed et al. |
| 5,754,352 | A | 5/1998 | Behrens et al. |
| 5,793,548 | A | 8/1998 | Zook |
| 5,822,142 | A | 10/1998 | Hicken |
| 5,909,332 | A | 6/1999 | Spurbeck et al. |
| 5,954,837 | A | 9/1999 | Kim |
| 6,069,758 | A | 5/2000 | Chung |
| 6,172,836 | B1 | 1/2001 | Bang |
| 6,275,346 | B1 | 8/2001 | Kim et al. |
| 6,307,696 | B1 | 10/2001 | Bishop et al. |

(Continued)

*Primary Examiner* — Emmanuel Bayard
(74) *Attorney, Agent, or Firm* — Setter Roche LLP; Kirk A Cesari

(57) ABSTRACT

In certain embodiments, a method may include receiving one or more equalized samples of an input signal. The method may further include mitigating one or more excursions in the one or more equalized samples based on one or more current decisions of an iterative decoding process to generate compensated equalized samples. In addition, the method may include performing iterative decoding operations based on the compensated equalized samples, updating the current decisions of the iterative decoding process and outputting the current decisions as a converged result when the iterative decoding operations have converged for the compensated equalized samples.

20 Claims, 7 Drawing Sheets

(56) References Cited

U.S. PATENT DOCUMENTS

| | | |
|---|---|---|
| 6,353,649 B1 | 3/2002 | Bockleman et al. |
| 6,480,349 B1 | 11/2002 | Kim et al. |
| 6,594,094 B2 | 7/2003 | Rae et al. |
| 6,594,098 B1 | 7/2003 | Sutardja |
| 6,760,185 B1 | 7/2004 | Roth et al. |
| 6,973,150 B1 | 12/2005 | Thuringer |
| 6,996,193 B2 | 2/2006 | Yamagata et al. |
| 7,035,029 B2 | 4/2006 | Sawada et al. |
| 7,068,461 B1 | 6/2006 | Chue et al. |
| 7,199,956 B1 | 4/2007 | Moser et al. |
| 7,602,568 B1 | 10/2009 | Katchmart |
| 7,643,548 B2 | 1/2010 | Hafeez |
| 7,665,007 B2 | 2/2010 | Yang et al. |
| 7,738,538 B1 | 6/2010 | Tung |
| 7,917,563 B1 | 3/2011 | Shih et al. |
| 7,995,691 B2 | 8/2011 | Yang |
| 7,997,582 B2 | 8/2011 | Wong |
| 8,077,571 B1 | 12/2011 | Xia et al. |
| 8,139,305 B2 | 3/2012 | Mathew et al. |
| 8,266,505 B2 | 9/2012 | Liu et al. |
| 8,400,726 B1 | 3/2013 | Wu et al. |
| 8,516,347 B1 | 8/2013 | Li et al. |
| 8,625,216 B2 | 1/2014 | Zhang et al. |
| 9,043,688 B1 | 5/2015 | Chan et al. |
| 9,077,501 B1 | 7/2015 | Oberg et al. |
| 9,129,646 B2 | 9/2015 | Mathew et al. |
| 9,178,625 B1 | 11/2015 | Klueda et al. |
| 9,236,952 B2 | 1/2016 | Sun et al. |
| 9,362,933 B1 | 6/2016 | Chaichanavong |
| 9,613,652 B2 | 4/2017 | Link et al. |
| 10,084,553 B1* | 9/2018 | Bellorado ......... H04L 25/03057 |
| 2002/0094048 A1 | 7/2002 | Simmons et al. |
| 2003/0026016 A1 | 2/2003 | Heydari et al. |
| 2003/0048562 A1 | 3/2003 | Heydari et al. |
| 2003/0185291 A1 | 10/2003 | Nakahira et al. |
| 2004/0047403 A1 | 3/2004 | Choi et al. |
| 2004/0190661 A1* | 9/2004 | Vrazel ............... H04L 25/03885 375/350 |
| 2005/0068918 A1* | 3/2005 | Mantravadi ........... H04L 1/0071 370/328 |
| 2007/0002890 A1 | 1/2007 | Mangold et al. |
| 2007/0018733 A1 | 1/2007 | Wang et al. |
| 2007/0205833 A1 | 9/2007 | Mar et al. |
| 2008/0292029 A1 | 11/2008 | Koslov |
| 2009/0268857 A1 | 10/2009 | Chen et al. |
| 2010/0104041 A1* | 4/2010 | Ibi ................. H04L 1/0003 375/285 |
| 2010/0138722 A1 | 6/2010 | Harley et al. |
| 2010/0211830 A1 | 8/2010 | Sankaranarayanan et al. |
| 2010/0272150 A1 | 10/2010 | Kil et al. |
| 2011/0072330 A1 | 3/2011 | Kolze |
| 2011/0158359 A1 | 6/2011 | Khayrallah et al. |
| 2013/0176154 A1 | 7/2013 | Bonaccio et al. |
| 2013/0182347 A1 | 7/2013 | Maeto |
| 2013/0339827 A1 | 12/2013 | Han et al. |
| 2014/0337676 A1 | 11/2014 | Yen et al. |
| 2014/0355147 A1 | 12/2014 | Cideciyan et al. |
| 2015/0124912 A1 | 5/2015 | Eliaz et al. |
| 2015/0179213 A1 | 6/2015 | Liao et al. |
| 2015/0189574 A1 | 7/2015 | Ng et al. |
| 2016/0055882 A1 | 2/2016 | Cideciyan et al. |
| 2016/0134449 A1 | 5/2016 | Liu et al. |
| 2016/0156493 A1 | 6/2016 | Bae et al. |
| 2016/0270058 A1 | 9/2016 | Furuskog et al. |
| 2016/0293205 A1 | 10/2016 | Jury et al. |
| 2017/0034623 A1* | 2/2017 | Christoph ............... H04R 5/027 |
| 2017/0162224 A1 | 6/2017 | Mathew et al. |

* cited by examiner

ITERATIVE RECOVERY FROM BASELINE OR TIMING DISTURBANCES

CROSS-REFERENCE TO RELATED APPLICATIONS

This application is a continuation of and claims priority to co-pending U.S. patent application Ser. No. 15/389,385, entitled "ITERATIVE RECOVERY FROM BASELINE OR TIMING DISTURBANCES", which was filed Dec. 22, 2016, the contents of which is incorporated herein by reference in its entirety.

SUMMARY

In certain embodiments, an apparatus may comprise a circuit configured to mitigate excursions in equalized samples based on current decisions of an iterative decoding process to generate compensated equalized samples.

In certain embodiments, a system may comprise an excursion compensation circuit configured to mitigate excursions in equalized samples based on current decisions of an iterative decoding process to generate compensated equalized samples.

In certain embodiments, a method may comprise receiving one or more equalized samples of an input signal. The method may further include mitigating one or more excursions in the one or more equalized samples based on one or more current decisions of an iterative decoding process to generate compensated equalized samples. In addition, the method may comprise performing iterative decoding operations based on the compensated equalized samples, updating the current decisions of the iterative decoding process and outputting the current decisions as a converged result when the iterative decoding operations have converged for the compensated equalized samples.

DETAILED DESCRIPTION

Figure 1:
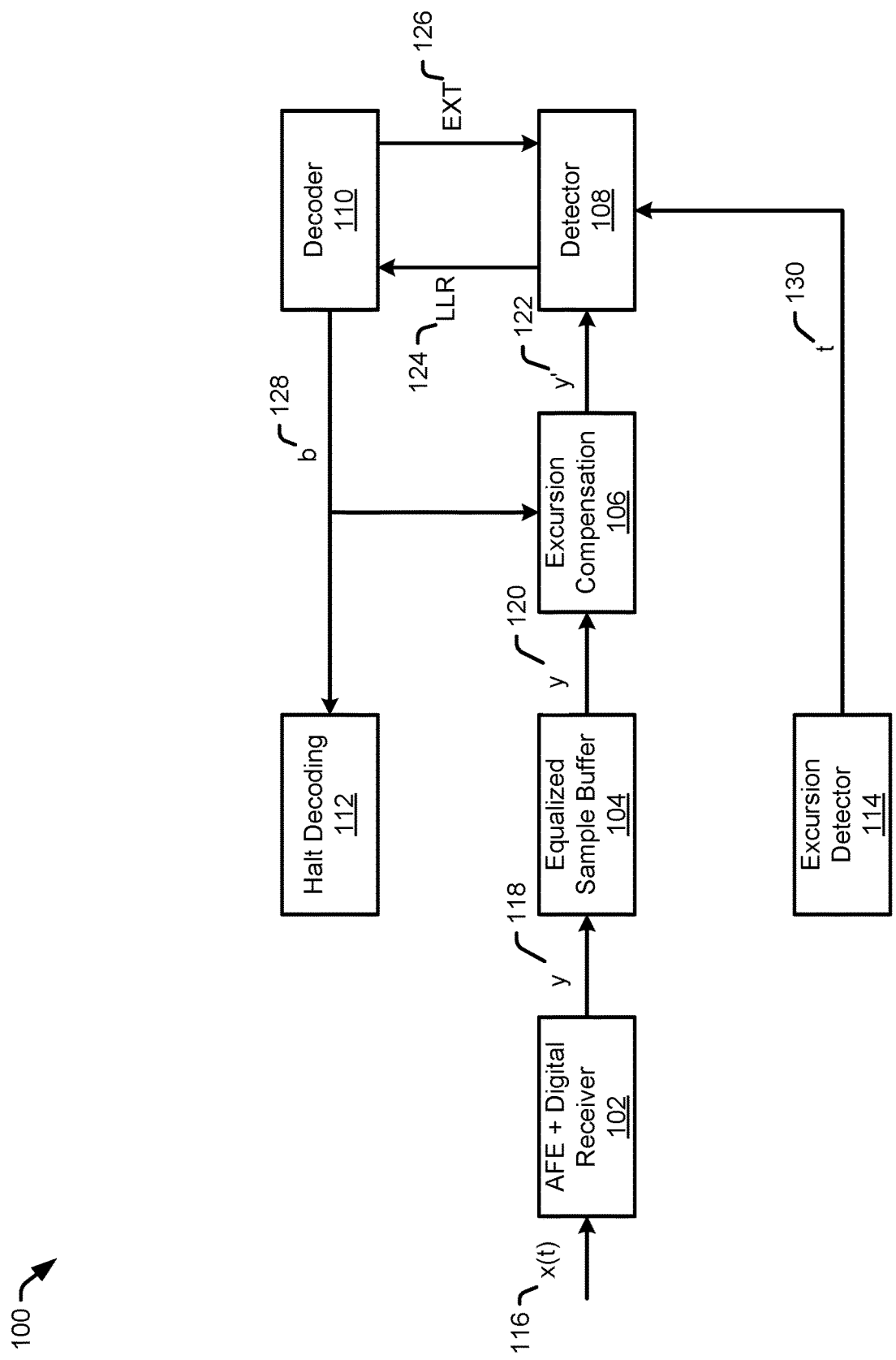
FIG. 1 is a block diagram of a system that may mitigate excursions, in accordance with certain embodiments of the present disclosure.

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with another embodiment, the methods and functions described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or device including instructions that when executed cause a processor to perform the methods.

The present disclosure generally relates to the determining data from a signal. Some systems, such as electrical, electronic, motor drive, processing, or other systems may receive a signal at a channel. In some embodiments, the present disclosure relates to mitigation of disturbances which may cause samples of the signal to deviate from expected values. In some examples relating to magnetic recording, such disturbances may compromise the integrity of a readback waveform of stored data. Two example types of disturbances may be referred to herein as baseline excursions and timing excursions.

Baseline disturbances may cause an instantaneous shift in the baseline of the readback waveform (e.g. the signal as read). In some magnetic recording examples, baseline disturbances may be attributed to instability in perpendicular magnetic recording heads. The DC offset in the signal may, due to high-pass poles in the analog front-end (AFE) of the receiver, decay over time at a rate governed by the frequencies of these poles. Although these events may be mitigated using re-reads, frequent baseline disturbances may cause throughput degradation.

Timing disturbances may cause instantaneous discontinuities in the phase of a write signal used to write the data to the media. For example, timing disturbances may be observed in some example heat assisted magnetic recording (HAMR) systems. These discontinuities, referred to herein as mode hops, may be the more serious of these disturbances, as the discontinues may compromise the integrity of the written data pattern on the media and, thus, may not be mitigated using a re-read. In the worst case, the discontinuities may lead to data-loss as the discontinuities may corrupt the pattern written to the media.

Examples according this disclosure may mitigate such events in an on-the-fly manner (i.e. without requiring re-reads). Such embodiments may both eliminate the performance degradation caused by the frequent re-reads which may be induced by baseline instabilities and may improve the integrity of the written data-pattern in the presence of mode hops. As such, the integrity of the equalized sample sequence may be maintained despite the occurrence of such events. Some embodiments may assume that presence of a disturbance does not cause the timing loop to lose lock or the offset loop to break. For example, if a timing loop is run to generate the equalized sample sequence, then the occurrence of a mode hop cannot cause the loop to lose lock. Similarly, if an offset loop is run, the occurrence of baseline instability cannot cause the offset loop to break. The occurrence of such events may induce a transient disturbance into the equalized sample sequence that may last a finite amount of time. The duration of the disturbance may be determined by the bandwidth settings of the respective loops. In some cases, a re-read may be performed if the disturbance is not resolved. For example, a re-read may be performed if the timing loop loses lock or if the offset loop breaks.

Referring to FIG. 1, a block diagram of a system that may mitigate excursions is shown and is generally designated 100. The system 100 can be one or more circuits configured to feed an input signal to a channel, perform equalization of the input signal, and perform bit detection on the equalized signal during the operation of the system 100. The system 100 can include an analog front end (AFE) and digital receiver 102 coupled to an equalized sample buffer 104, the equalized sample buffer 104 coupled to an excursion compensation 106, the excursion compensation block 106 coupled to a detector 108, the detector 108 coupled to a decoder 110, the decoder 110 coupled to a halt decoding block 112, and an excursion detector 114 coupled to the detector 108.

Each of the analog front end (AFE) and digital receiver 102, equalized sample buffer 104, excursion compensation block 106, detector 108, decoder 110, halt decoding block 112, and excursion detector 114 may be a separate circuit, part of a system on chip (SOC), firmware, a processor(s), or other system not listed, or any combination thereof.

The system 100 may be an iterative decoding system. In operation, the AFE and digital receiver 102 may receive a continuous-time signal x(t) 116. The AFE and digital receiver 102 may produce an equalized sample sequence (y) 118 by sampling and processing the signal x(t) 116.

The equalized sample buffer 104 may store the equalized sample sequence y 118. During detection/decoding operations, the equalized sample buffer 104 may provide the equalized sample sequence y 118 to the excursion compensation block 106 as the equalized sample sequence y 120. In some examples, the equalized sample sequence y 120 may be provided to the excursion compensation 106 repeatedly throughout the detection/decoding procedure, for example, at each iteration of an iterative decoding process.

The excursion compensation block 106 may act to pre-process the equalized sample sequence y 120 to compensate for, for example, baseline excursions and timing excursions as the samples are transferred from the equalized sample buffer 104 to the detector 108. In some examples, decisions b 128 which may be generated by the detection/decoding operations may also be utilized to perform excursion compensation. Additional details of an example excursion compensation block are discussed below.

The excursion compensation block 106 may output the compensated sample sequence y' 122 to the detector 108. The detector 108 and decoder 110 may perform an iterative detection/decoding process based on the compensated sample sequence y' 122.

The detector 108 may take, as input, the compensated equalized sample sequence y' 122 and may produce values 124 which may be representative of the probability that each bit is a zero or one. The values 124 may be represented as the log of the ratio of the probability the bit is 0 to the probability the bit is 1 (or vice versa) and may be referred to as log likelihood ratios or LLRs. The detector 108 may act to generate the LLRs values based on knowledge of a channel response (e.g. the expected channel output for each possible written/transmitted data pattern). In some examples, the detector 108 may employ a Soft-Output Viterbi Algorithm (SOVA) or a BCJR Algorithm.

The generated LLRs 124 may be passed to the decoder 110 which may generate values 126 which may be representative of the probability that each bit is a zero or one, for example, based on a structure of a utilized code. The values 126 may be referred to as extrinsic information (EXT) 126. The EXT 126 may be passed back to the detector 108. In some examples, the EXT 126 may not include the information passed to the decoder 110 by the detector 110 (e.g. LLRs 124). For example, the decoding process may be configured such that the output of the detector 108 and decoder 110 may be the sum of the received information and the produced information which may be referred to herein as total information. Here, the passed information may be removed from, or subtracted off of, the total information before being applied to the other processing block.

On each iteration, decisions b 128 may be generated by the decoder 110 based on the current iteration of the LLRs 124 and EXT 126 and output to the excursion compensation 106 to be utilized to perform excursion compensation block 106. The decisions b 128 may be based on the total information generated by the detector 108 or decoder 110. The decisions b 128 may be the most reliable decisions available at each iteration. As such, the reliability of the decisions b 128 may increase at each iteration.

The excursion detector 114 may be configured to provide side-information to the detector 106 about which samples may be affected by an excursion. Though included in FIG. 1, the excursion detector 114 may not be included in some embodiments. In some embodiments that include the excursion detector 114, the robustness of the system for excursions of significant magnitudes may be improved. Further, in some examples, the excursion detector may utilize samples and decisions (e.g. decisions generated using another detector in the channel). The excursion detector may use these samples to estimate if an excursion is present in the samples. Additional details of an example excursion detector 114 are discussed below.

The iterative detection/decoding process may continue until a maximum amount of time has passed (e.g. measured in total number of iterations), or may continue until the decoding is considered to be a success. The halt decoding block 112 may be configured to determine when to discontinue the iterative detection/decoding process. For example, the halt decoding block 112 may determine decoding has been successful when the decisions generated based on the total information indicate that convergence to a codeword has been achieved.

Figure 2:
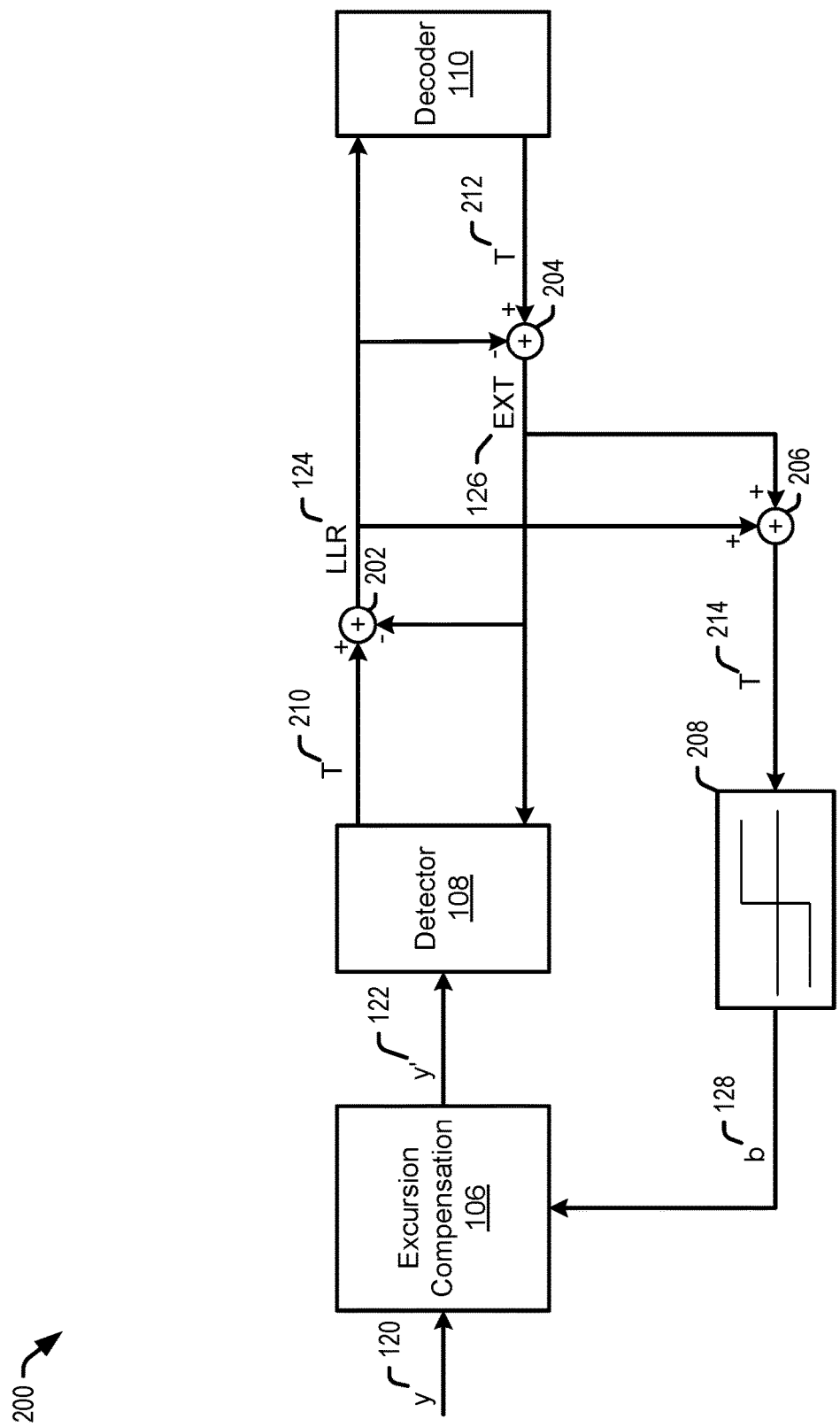
FIG. 2 is a block diagram of a system that may mitigate excursions, in accordance with certain embodiments of the present disclosure.

FIG. 2 illustrates a block diagram of a system 200 which may mitigate excursions in accordance with certain embodiments of the present disclosure. In particular, in addition to the excursion compensation block 106, the detector 108, and the decoder 110; the system 200 includes adders 202-206 and a slicer 208 and does not include an excursion detector, such as excursion detector 114. The operation of the system 200 is substantially similar to the operation of system 100 and, for brevity, system 200 will be described herein regarding additional or different details while details that are the same or similar may not be repeated.

As illustrated, detector 108 may receive compensated equalized samples y' 122 from the excursion compensation block 106 and the extrinsic information EXT 126 from the adder 204. Based on the compensated equalized samples y' 122 and the extrinsic information EXT 126, the detector 108 may perform detection operations to generate total information T 210. The total information T 210 may be output to the adder 202.

The adder 202 may receive the total information T 210 and the extrinsic information EXT 126. The adder 202 may also subtract the extrinsic information EXT 126 from the total information T 210 and the result may be output to the decoder 110 as LLRs 124. Although the adder 202 is illustrated as a separate circuit, in some embodiments, the adder 202 may be included in one of the detector 108 or the decoder 110.

The decoder 110 may receive the LLRs 124 from the detector 108 from the adder 202. Based on the LLRs 124, the decoder 110 may perform decoding operations to generate total information T 212. The total information T 212 may be output to the adder 204.

The adder 204 may receive the total information T 212 and the LLRs 124. The adder 204 may subtract the LLRs 124 from the total information T 212 and the result may be output to the detector 108 as EXT 126. Although the adder 204 is illustrated as a separate circuit, in some embodiments, the adder 204 may be included in one of the detector 108 or the decoder 110.

The adder 206 may receive the current iteration's LLRs 124 and EXT 126 from the adders 202 and 204, respectively. The adder 206 may sum the LLRs 124 and the EXT 126 to determine the total information 214 for the current iteration. The total information 214 for the current iteration may be output to the slicer block 208.

The slicer block 208 may operate to determine decisions based on the total information 214 for the current iteration. Generally, a slicer may receive as input a probability value (e.g. a log likelihood ratio) for a bit and may generate the more likely value for that bit. For example, if a bit has a 35% probability of being a zero (0), then the slicer may output a one (1) because the bit has a 65% chance of being a one (1). In operation, the slicer block 208 may generate decisions b 128 based on the total information 214. For example, the slicer block 208 may determine the value of b using a hard limit slicer in which the value is determined based on whether the total information 214 reaches a threshold. As mentioned above, the decisions 128 may be output to the excursion compensation block 106 for use in generating the compensated equalized samples y' 122.

Figure 3:
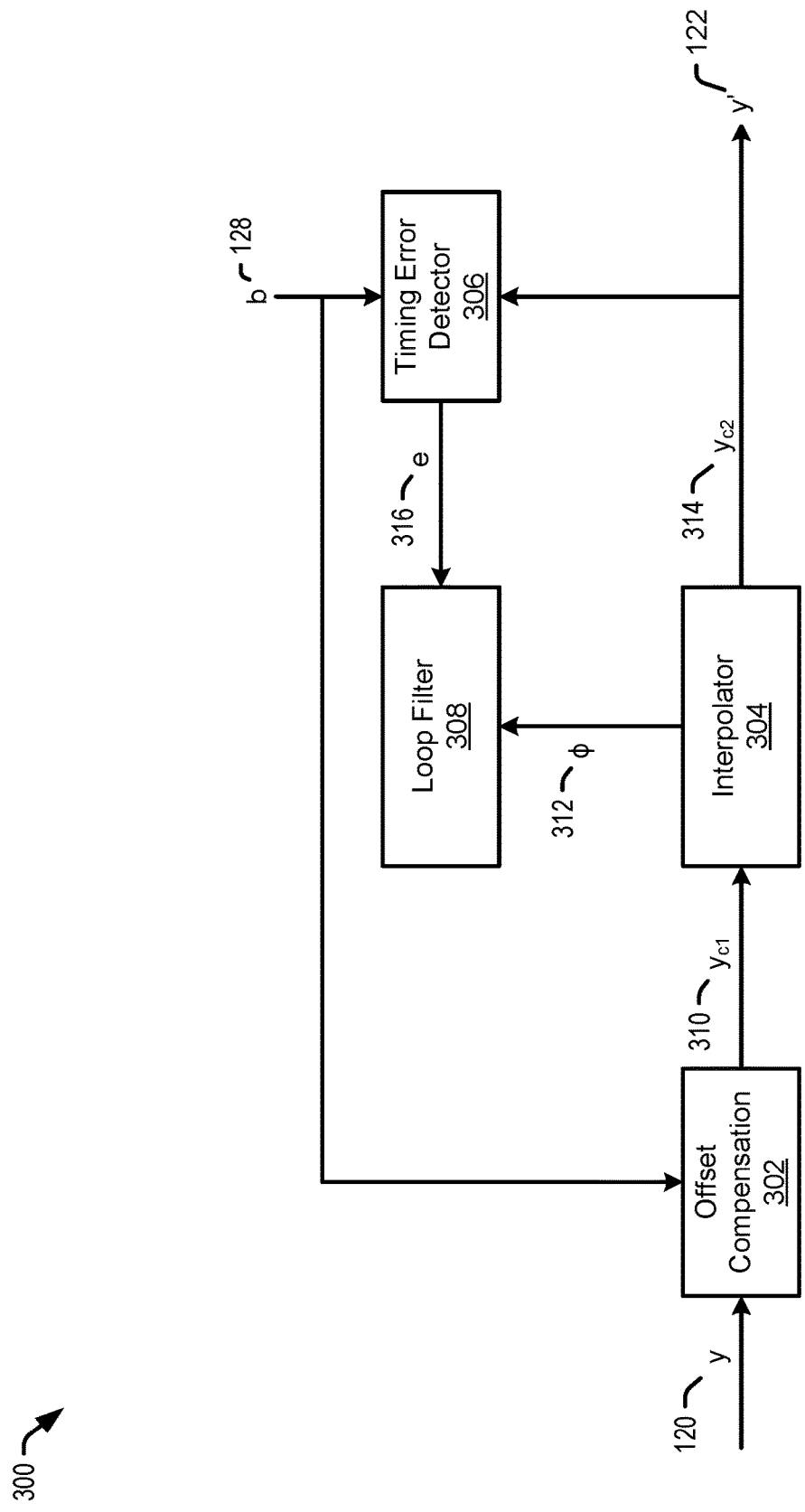
FIG. 3 is a block diagram of an excursion compensation that may be utilized to mitigate excursions, in accordance with certain embodiments of the present disclosure.

Referring to FIG. 3, a block diagram of an excursion compensation block is shown and is generally designated 300. The excursion compensation block 300 may generate compensated equalized samples y' 122 from the uncompensated equalized samples y 120 using decisions b 128 provided to it by the detector/decoder operations. As mentioned above, the decisions b 128 may be based on the total information generated by the detector 108 or decoder 110. The excursion compensation block 300 may include an offset compensation block 302, an interpolator 304, a timing error detector 306 and a loop filter 308.

In operation, the excursion compensation block 300 may receive samples read from the equalized sample buffer 104. The equalized sample sequence y 120 and the associated decisions b 128 may be received at an offset compensation block 302.

The offset compensation block 302 may estimate a DC offset in the equalized sample sequence y 120 and may remove the estimated DC offset to generate an offset compensated sample sequence $y_{c1}$ 310. For example, the offset compensation block 302 may generate an error as the difference between the equalized sample sequence y 120 and an estimate of the equalized sample sequence y 120. For example, if the equalized sample sequence y 120 were equalized to match a target sample sequence z, an error may be generated based on a difference between the equalized sample sequence y 120 and a convolution of the target sample sequence z with the associated decisions b 128. Thus, the target sample sequence z may be generated as a convolution of the target and the detected bit sequence. The error may then be generated as a difference of the target sample sequence and the equalized sample sequence. This error may have a zero mean, unless an offset is present in the signal. In some examples, the error may be averaged to estimate the estimated DC offset. The offset compensated samples yci 310 may be output to the interpolator 304.

The interpolator 304 may modify the sampling phase of the offset compensated sample sequence $y_{c1}$ 310. For example, the interpolator 304 may modify the sampling phase by a phase shift value ϕ 312 to generate an offset and phase compensated sample sequence $y_{c2}$ 314. The interpolator 304 may operate by applying a signal to an interpolation filter. In some examples, the interpolation filter may be a finite impulse response filter (FIR) with coefficients that may be chosen to shift the phase by a given amount either backwards or forwards. In this context, the interpolator 304 may interpolate based on a phase shift value ϕ 312 which may change over time. As such, the interpolator 304 may maintain a set of coefficients to be used for the possible values of ϕ. For example, if ϕ is 20% of T, the interpolator may utilize one set of coefficients and may utilize a different set when ϕ is −30% of T. In some examples, the number of sets of coefficients may be determined by quantizing ϕ 312 and utilizing the set of coefficients closest to the quantized ϕ 312. These samples may be output to the decoder 108 (e.g. as compensated equalized samples y' 122).

The timing error detector 306 may operate to generate the error e 316 between a current (estimated) sampling phase and a desired sampling phase. The generation of the error e 316 between the current (estimated) sampling phase and the desired sampling phase may involve generating the error e 316 based on the offset and phase compensated sample sequence $y_{c2}$ 314 and a target sample sequence. For example, the error e 316 may be generated by multiplying an amplitude error between the sequence 314 and the target by a slope of the signal. The error e 316 may be output to the loop filter 308.

The loop filter 308 may generate the phase shift value ϕ 312 by averaging the timing error e 316. For example, the loop filter 308 may generate the phase shift value ϕ 312 such that the sampling occurs earlier in response to a positive error e 316. Similarly, the loop filter may generate the phase shift value ϕ 312 such that the sampling occurs later in response to a negative error e 316. As mentioned above, the phase shift value ϕ 312 may be output to the interpolate 304 to be applied to samples for the next iteration.

Embodiments are not limited to the example illustrated in FIG. 3. For example, the phase compensation may be performed before the offset compensation.

Figure 4:
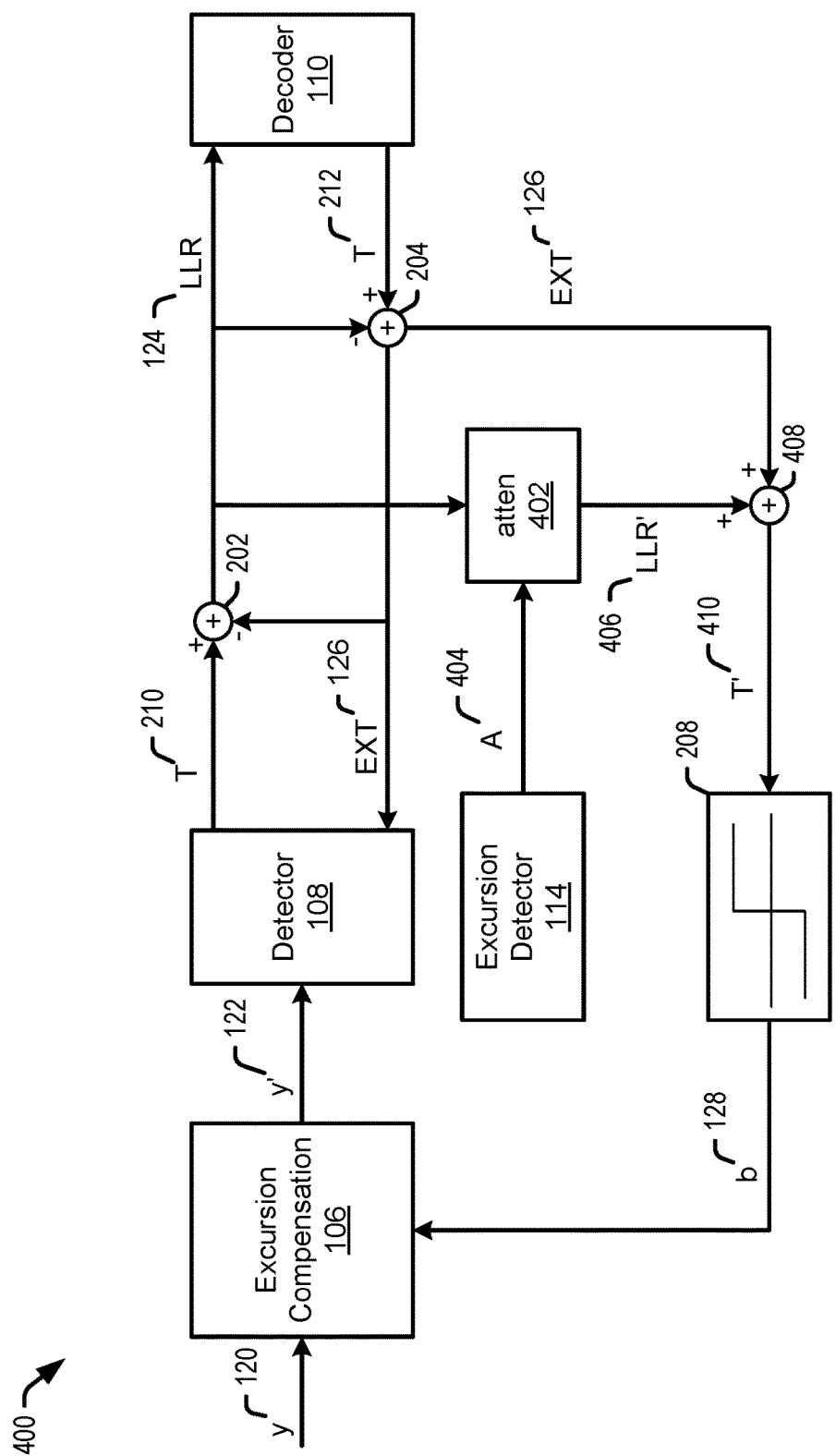
FIG. 4 is a block diagram of a system that may mitigate excursions, in accordance with certain embodiments of the present disclosure.
Figure 5:
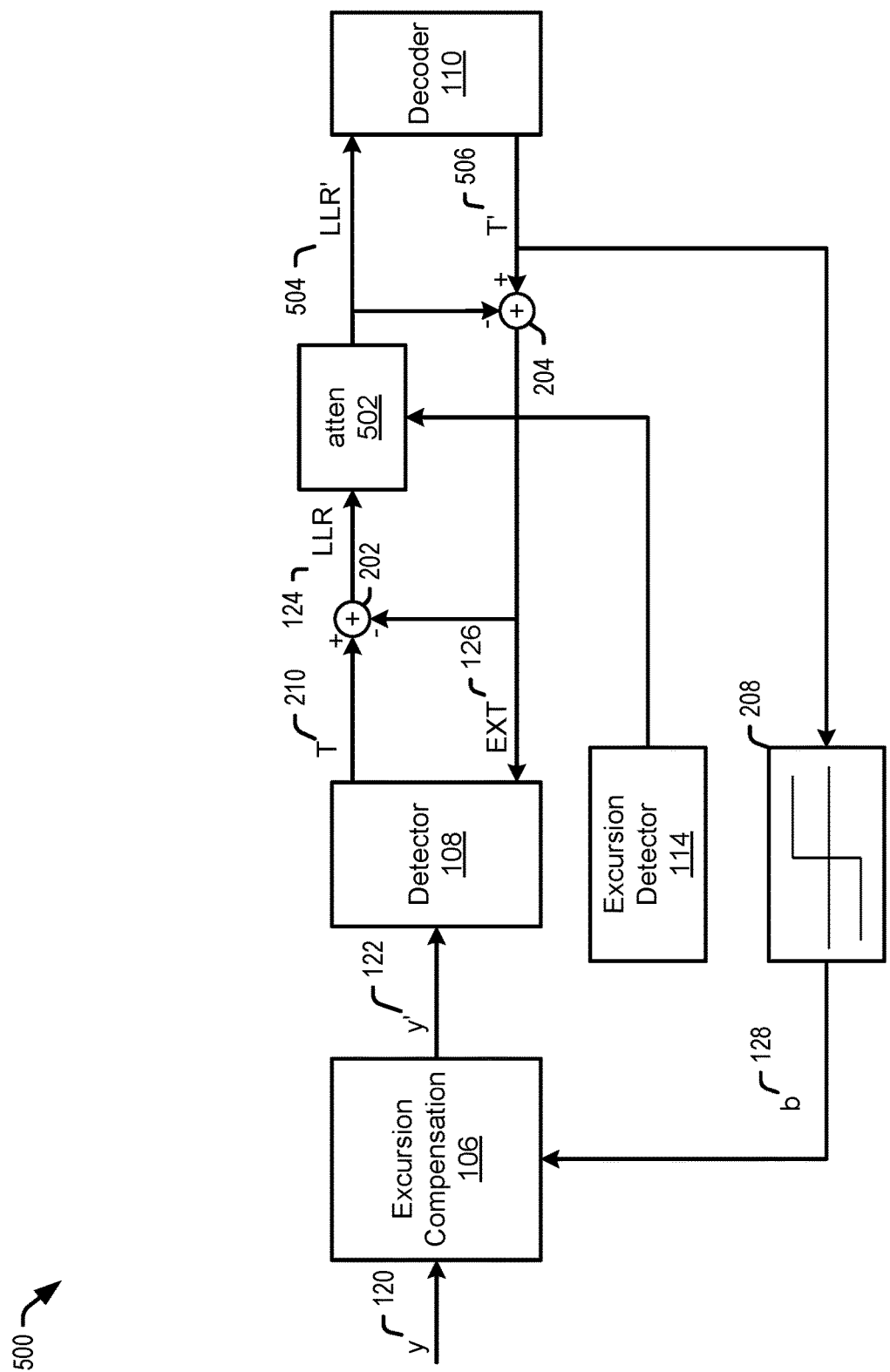
FIG. 5 is a block diagram of a system that may mitigate excursions, in accordance with certain embodiments of the present disclosure.

FIGS. 4 and 5 provide additional details of example embodiments of systems 400 and 500 which may mitigate excursions and which include excursion detectors, such as excursion detector 114. The operation of the systems 400 and 500 are similar to the system 200 and discussion of similar portions may be omitted for brevity and ease of understanding. In addition to the blocks discussed above with respect to FIG. 2, systems 400 and 500 may also include the excursion detector 114 and one of attenuation blocks 402 or 502.

Although the total information 214 may be used as a reliable source for decisions at any point in the iterative decoding process, the total information may not be as reliable during periods of disturbances. For example, degraded reliability may be due to how the detector 108 and decoder 110 operate. In some embodiments, the detector 108 may generate information for each bit based on the corresponding sample and one or more samples physically adjacent or proximate to the corresponding sample. As both types of disturbances may affect a plurality of bits in the region of the disturbance, the information generated by the detector 108 for a bit affected by a disturbance may be compromised by the disturbance and, in some cases, the compromise of the information may be significant.

On the other hand, the decoder 110 may generate information for a bit based on information received from bits adjacent to it in the code graph which, physically, may be located anywhere on a media (e.g. a magnetic recording media of a hard disc drive). As such, a bit affected by a disturbance may be more likely to receive reliable information from the decoder 110 than from the detector 108 as the bits used to generate that information may be less likely to be compromised by the same disturbance.

In the embodiment of FIG. 2, the contribution to the total information of the information produced by the detector 108 and the decoder 110 may be equivalent. In some embodiments, such as those illustrated in FIGS. 4 and 5, the overall reliability may be improved by accounting for the lower reliability of information from the detector 108 by inclusion of an excursion detector 114. In some examples, the excursion detector 114 may, for each equalized sample, determine if the equalized sample has been affected by a disturbance and provide an indication of this to the detector/decoder system. In an example, the excursion detector 114 may operate to detect excursions by averaging an error generated by the timing and offset loops.

The particular excursion detection process may vary from embodiment to embodiment. In some examples, the excursion detection process may be able to determine which samples are affected by an excursion and, in some embodiments, the degree to which the samples are affected. For example, the excursion detector 114 may estimate a DC offset, apply the DC offset to an averaging filter, and compare the output of the averaging filter to a threshold (or multiple thresholds) to determine if an excursion occurred and, if so, the severity of the excursion.

In the examples of FIGS. 4 and 5, based on the determination of which samples are affected by an excursion and the degree to which the samples are affected, the excursion detector 114 may output an attenuation control value 404 to the attenuation blocks 402 and 502, respectively. In some embodiments, the applied values may be log-likelihood ratios (LLRs) whose sign indicates the more likely value (e.g. negative means 1 is more likely, positive means 0 is more likely, or vise-versa) and whose magnitude may indicate the confidence. For example, an LLR of 0 may mean zero and one are equally likely, a +10 may means 0 is somewhat more likely than a 1, and a +100 may mean a 0 is significantly more likely than a 1. In such examples, dividing (or attenuate) the LLR value does not change the more likely value, but may reduce the confidence. The attenuation may be determined based on the magnitude of the excursion. For example, if baseline occurs and the estimated DC offset is 5% of the signal amplitude, the attenuation control value 404 may be set to cause no attenuation. On the other hand, if the estimated DC offset is 20% of the signal amplitude, the attenuation control value 404 may be set to divide the LLRs by 2 and if the estimated DC offset is estimated at 100% of the signal amplitude, the attenuation control value 404 may be set to divide the LLRs by 8.

In some embodiments, the attenuation blocks 402 and 502 may operate to reduce the contribution of the detector 108 output (e.g. LLRs 124) to the total information by scaling down the magnitude of the LLRs 124. Systems 400 and 500 may accomplish the scaling of the contribution of the LLRs 124 in two example manners.

In FIG. 4, the attenuation block 402 may attenuate the contribution of the LLRs 124 for the production of the data input to the excursion compensation block 106 but not affect the LLRs 124 received by the decoder 110. As illustrated in FIG. 4, the LLRs 124 may be received by the decoder 110 and the attenuation block 402. The attenuation block may further receive the attenuation value (A) 404 and may attenuate the LLRs 124 to produce the attenuated LLRs' 406. The attenuated LLRs' 406 may be output to the adder 408 which may produce a sum of the attenuated LLRs' 406 and the EXT 126 from the adder 204 to produce an adjusted total information (T') 410.

In system 400 of FIG. 4, the detector/decoder operations may not utilize the attenuated LLRs' 406 and, therefore, the detector/decoder may affected only through the sampling modification performed by excursion compensation block 106 based on the adjusted total information (T') 410.

On the other hand, in the example of FIG. 5, the attenuation block 502 may be inserted into the detector/decoder operations and may output the attenuated LLRs' 504 to the inputs of the decoder 110 in place of the LLRs 124. As such, the decoder 110 may utilize the attenuated LLRs' to generate the total information T' 506. In other words, the attenuation operation may affect both the sample compensation by excursion compensation block 106 and the detection/decoding operation of the detector 108 and the decoder 110.

In some examples according to either FIG. 4 or FIG. 5, the attenuation block 402 or 502 may operate to reduce the contribution of the LLRs relative to the extrinsic information (EXT) in production of the total information used to generate the decisions b for the excursion compensation 106. For example, the LLRs may be scaled down by $\beta<1$ for samples with associated an accumulated timing error magnitude in excess of a specified threshold. In another example, the LLRs may be scaled down by a value which may be proportional to the accumulated timing error magnitude. As the accumulated timing error may be somewhat noisy, the scale may be chosen as 1 for accumulated timing errors with a magnitude smaller than a specified threshold.

In addition, some embodiments may shift the time-base of the output of the excursion detector 114. For example, the time-base may be shifted because the magnitude of the excursions may be greatest immediately following the excursion. In such cases, the detection algorithm may take some amount of time (latency) to determine that an excursion has occurred (e.g. it may take time for the accumulated timing error to reach a specified threshold). As such, shifting the detection to an earlier time may improve performance. While such a shift in time may cause the LLRs to be modified for bits preceding the disturbance, this effect may be minimal compared to the degradation in performance caused by mis-detecting bits corresponding to the largest magnitude of the excursion.

Figure 6:
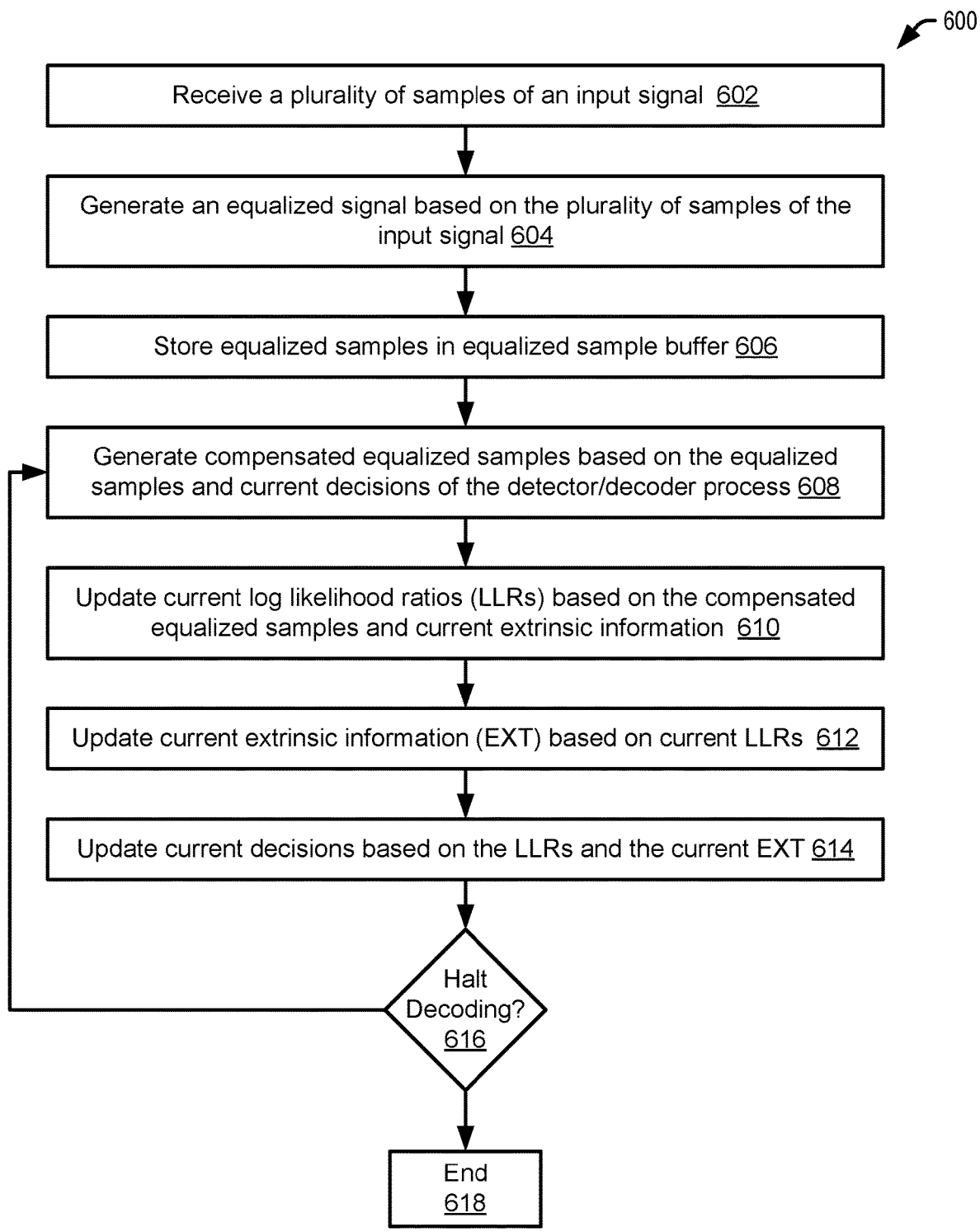
FIG. 6 is a flowchart of a method that may mitigate excursions, in accordance with certain embodiments of the present disclosure.

Referring to FIG. 6, a flowchart of a method of mitigating excursions is shown and is generally designated 600. The method 600 can be an embodiment of one or more of the systems 100-500.

The system may receive a plurality of samples of an input signal at 602. At 604, the system may generate an equalized signal including a plurality of equalized samples based on the plurality of samples of the input signal, for example, as discussed above with regard to FIG. 1. At 606, the equalized samples may be stored in an equalized sample buffer. The system may then generate compensated equalized samples (y') based on the buffered equalized samples (y) and current decisions (b) of a detector/decoder process at 608, for example, as discussed above with regard to FIGS. 1-5. Next, the system may update one or more current log likelihood ratios (LLRs) based on the compensated equalized samples (y') and current extrinsic information (EXT) at 610. At 612, the current extrinsic information may be updated based on the current LLRs. Next, the current decisions may be updated based on the current LLRs and the current EXT at 614. One or both of the update of the current extrinsic information and the update of the current decisions (b) may be based on attenuation values which may be used to attenuate the LLRs prior to updating the EXT and the current decisions (b), for example, as discussed above with regard to FIGS. 4-5.

At 616, the system may determine whether a halt condition has been met. For example, halt conditions may include the decoding being considered a success or the passage of a maximum amount of time (e.g. measured in total number of iterations). If the halt condition has been met, the process continues to 618 and ends. Otherwise, the process may return to 608 for one or more additional iterations.

All steps listed for the method 600 may be applied to systems that utilize iterative decoding. Many variations would be apparent to one of ordinary skill in the art in view of this specification. For example, the operations of process 600 may be performed in parallel or in another order. In addition, components and circuits used to perform the operations in the method may be discrete, integrated into a system on chip (SOC), or other circuits. Further, the steps can be carried out in a processor (e.g. a digital signal processor), implemented in software, implemented via firmware, or by other means.

Figure 7:
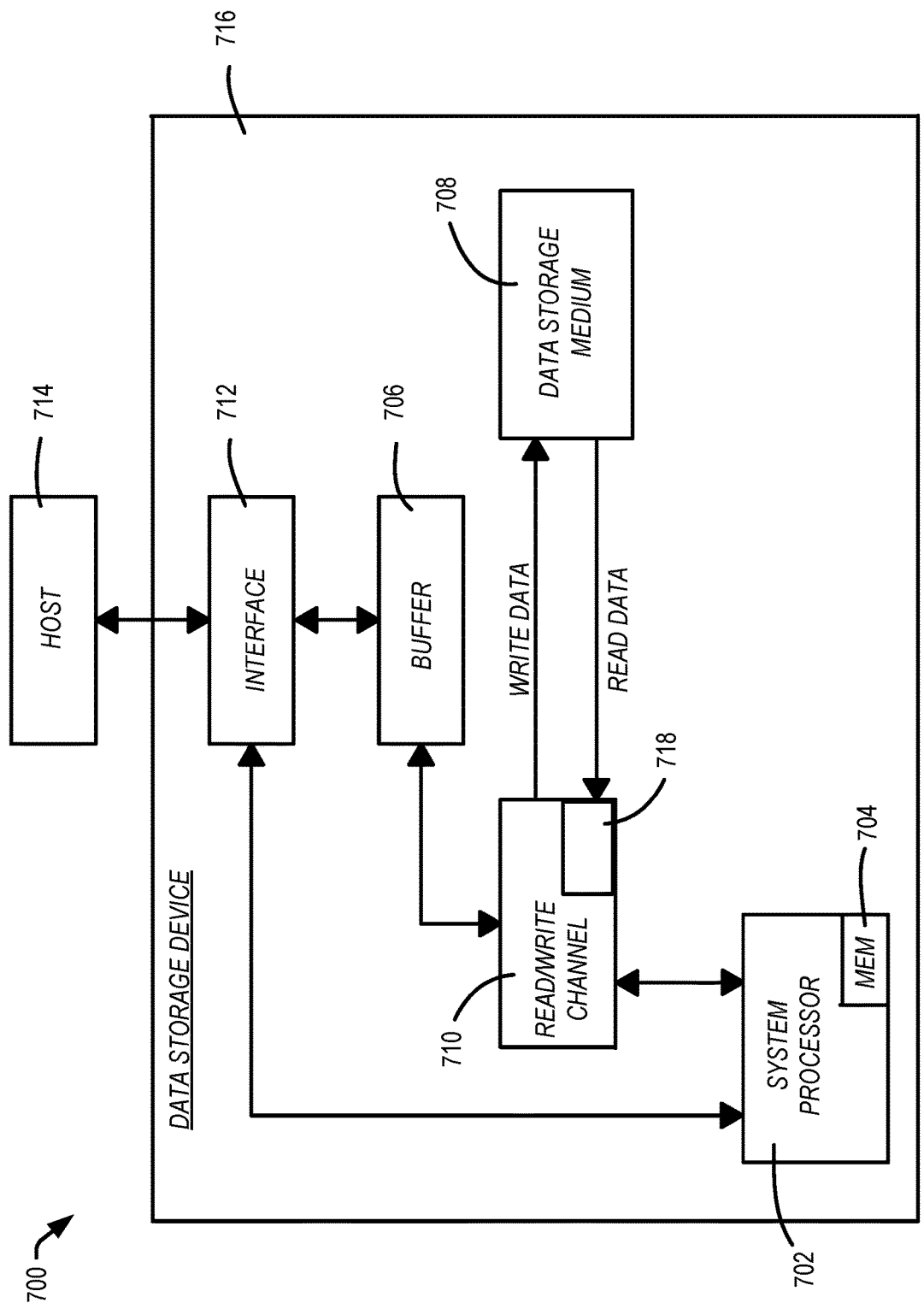
FIG. 7 is a block diagram of a system that may mitigate excursions, in accordance with certain embodiments of the present disclosure.

Referring to FIG. 7, a block diagram of a system of mitigating excursions is shown and generally designated 700. The system 700 can be an example of a data storage device (DSD), and may be an example implementation of systems 100, 200 or 500. The DSD 716 can optionally connect to and be removable from a host device 714, which can be a device or system having stored data, such as a desktop computer, a laptop computer, a server, a digital video recorder, a photocopier, a telephone, a music player, other electronic devices or systems not listed, or any combination thereof. The data storage device 716 can communicate with the host device 714 via the hardware/firmware based host interface circuit 712 that may include a connector (not shown) that allows the DSD 716 to be physically connected and disconnected from the host 714.

The DSD 716 can include a system processor 702, which may be a programmable controller, and associated memory 704. The system processor 702 may be part of a system on chip (SOC). A buffer 706 may temporarily store data during read and write operations and can include a command queue. The read/write (R/W) channel 710 can encode data during write operations to, and reconstruct data during read operations from, the data storage medium 708. The data storage medium 708 is shown and described as a hard disc drive, but may be other types of medium, such as a flash medium, optical medium, or other medium, or any combination thereof.

The R/W channel 710 may receive data from more than one data storage medium at a time, and in some embodiments can also receive multiple data signals concurrently, such as from more than one output of a read head. For example, storage systems having two-dimensional magnetic recording (TDMR) systems can have multiple reading or recording elements, and can read from two tracks simultaneously or nearly simultaneously. Multi-dimensional recording (MDR) systems can receive two or more inputs from multiple sources (e.g. recording heads, flash memory, optical memory, and so forth). The R/W channel 710 can combine multiple inputs and provide a single output, as described in examples herein.

The block 718 can implement all of or part of the systems and functionality of systems 100-500 and method 600. In some embodiments, the block 718 may be a separate circuit, integrated into the R/W channel 710, included in a system on chip, firmware, software, or any combination thereof.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, the figures and above description provide examples of architecture and voltages that may be varied, such as for design requirements of a system. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
    a circuit configured to:
        mitigate one or more excursions in one or more equalized samples based on one or more current decisions of an iterative decoding process to generate compensated equalized samples.

2. The apparatus of claim 1, further comprising the circuit further configured to:
    perform iterative decoding operations of the iterative decoding process based on the compensated equalized samples.

3. The apparatus of claim 2, further comprising the circuit further configured to perform the iterative decoding operations to update the current decisions of the iterative decoding process.

4. The apparatus of claim 2, further comprising the circuit further configured to:
    detect an excursion in the equalized samples and output an attenuation value based on the detected excursion;

perform a decoding operation of the iterative decoding operations to generate a decoding output;

perform a detection operation of the iterative decoding operations to generate a detection output;

perform attenuation of the detection output to generate an attenuated detection output; and generate the updated current decisions of the iterative decoding process based on the decoding output and the attenuated detection output; and the decoding operation of the iterative decoding operations being performed to generate the decoding output based on the attenuated detection output.

5. The apparatus of claim 1, further comprising the circuit further configured to perform mitigation by:

estimating a timing offset based on the current decisions;

applying the timing offset to the equalized samples to generate offset compensated samples;

interpolating the offset compensated samples by modifying a sampling phase of the offset compensated samples based on a phase shift value to generate the compensated equalized samples.

6. The apparatus of claim 5, further comprising the circuit configured to:

determine a timing error based on an estimated sampling phase and a desired sampling phase; and determine the phase shift value based on the timing error.

7. The apparatus of claim 1, further comprising the circuit further configured to:

receive and store the one or more equalized samples in an equalized sample buffer; and perform mitigation on the one or more stored equalized samples on each iteration of the iterative decoding process based on the one or more updated decisions.

8. The apparatus of claim 1, further comprising the circuit further configured to:

halt the iterative decoding operations when the iterative decoding operations have converged for the compensated equalized samples.

9. A system comprising:

an excursion compensation circuit configured to mitigate one or more excursions in one or more equalized samples based on one or more current decisions of an iterative decoding process to generate compensated equalized samples.

10. The system of claim 9, further comprising:

an iterative decoding circuit configured to:

perform iterative decoding operations of the iterative decoding process based on the compensated equalized samples.

11. The system of claim 10, further comprising:

iterative decoding circuit configured to:

update the current decisions of the iterative decoding process.

12. The system of claim 11, further comprising:

an excursion detection circuit configured to detect an excursion in the equalized samples and output an attenuation value based on the detected excursion;

the iterative decoding circuit configured to perform the iterative decoding operations by:

performing a decoding operation of the iterative decoding operations to generate a decoding output;

performing a detection operation of the iterative decoding operations to generate a detection output;

performing attenuation of the detection output to generate an attenuated detection output; and updating the current decisions of the iterative decoding process based on the decoding output and the attenuated detection output; and the iterative decoding circuit configured to perform the decoding operation of the iterative decoding operations by:

generating the decoding output based on the attenuated detection output.

13. The system of claim 10, further comprising:

an equalized sample buffer configured to store equalized samples; and the excursion compensation circuit configured to perform the mitigation on the stored samples on each iteration of the iterative decoding process based on the updated current decisions.

14. The system of claim 9, further comprising the excursion compensation circuit configured to mitigate one or more excursions in one or more equalized samples by:

estimating a timing offset based on the current decisions;

applying the timing offset to the equalized samples to generate offset compensated samples;

interpolating the offset compensated samples by modifying a sampling phase of the offset compensated samples based on a phase shift value to generate the compensated equalized samples.

15. The system of claim 14, further comprising the excursion compensation circuit configured to mitigate one or more excursions in one or more equalized samples by:

determining a timing error based on an estimated sampling phase and a desired sampling phase; and determining the phase shift value based on the timing error.

16. The system of claim 8, further comprising:

an iterative decoding circuit configured to:

halt the iterative decoding operations when the iterative decoding operations have converged for the compensated equalized samples.

17. A method comprising:

receiving one or more equalized samples of an input signal;

mitigating one or more excursions in the one or more equalized samples based on one or more current decisions of an iterative decoding process to generate compensated equalized samples;

performing iterative decoding operations of the iterative decoding process based on the compensated equalized samples;

updating the current decisions of the iterative decoding process;

outputting the current decisions as converged results when the iterative decoding operations have converged for the compensated equalized samples.

18. The method of claim 17, further comprising outputting the one or more updated decisions as converged results when the iterative decoding operations have converged for the one or more second compensated equalized samples.

19. The method of claim 17, further comprising:

storing the one or more equalized samples in an equalized sample buffer; and performing the mitigation on the one or more stored equalized samples in the equalized sample buffer on each iteration of the iterative decoding process based on the one or more updated decisions.

20. The method of claim 17, further comprising performing the mitigating further comprising:

determining a timing error based on an estimated sampling phase and a desired sampling phase; and determining the phase shift value based on the timing error.

\* \* \* \* \*